(No Model.) 2 Sheets—Sheet 1.

I. BARKER.
BALL AND ROLLER BEARING FOR VEHICLES.

No. 557,941. Patented Apr. 7, 1896.

Witnesses,
Will G. Olden.
Frank Henney.

Inventor,
Irving Barker,
By N. DuBois, Atty.

(No Model.)  2 Sheets—Sheet 2.

I. BARKER.
BALL AND ROLLER BEARING FOR VEHICLES.

No. 557,941.　　　　　　　　　Patented Apr. 7, 1896.

Witnesses,  
A. D. DuBois.  
J. A. Bailey.

Inventor,  
IRVING BARKER.  
by Atty. N. DuBois.

United States Patent Office.

IRVING BARKER, OF SPRINGFIELD, ILLINOIS.

BALL AND ROLLER BEARING FOR VEHICLES.

SPECIFICATION forming part of Letters Patent No. 557,941, dated April 7, 1896.

Application filed March 28, 1895. Serial No. 543,515. (No model.)

*To all whom it may concern:*

Be it known that I, IRVING BARKER, a citizen of the United States, residing at Springfield, in the county of Sangamon and State of Illinois, have invented certain new and useful Improvements in Ball and Roller Bearings for Vehicles, of which the following is such a full, clear, and exact description as will enable those skilled in the art to which it pertains to make and use my said invention.

My invention is particularly designed for use on mine-cars, though it may obviously be applied to any vehicle of that class in which wheels rotating on fixed axles are employed.

My invention relates to that class of ball and roller bearings which employ both balls and rollers; and the purpose of my invention is to provide simple and effective means for separating the rollers from the balls, so as to prevent displacement of the rollers by the engagement of the balls therewith, which is a common objection to roller and ball bearings as heretofore constructed.

Another purpose of my invention is to provide hardened flat surfaces on which the balls may turn, the parts provided with such hardened surfaces being so constructed and arranged as to be easily removable for the purpose of repair or replacement.

Another purpose of my invention is to provide simple and effective means whereby the end thrust arising from the longitudinal movement of the wheels on the axle may be received by a detachable plate so constructed and arranged that said plate may be readily removed for replacement or repair.

With these ends in view my invention consists of certain novel features of construction and combinations of parts shown in the annexed drawings, to which reference is hereby made, and hereinafter particularly described and specifically claimed.

Figure 1:
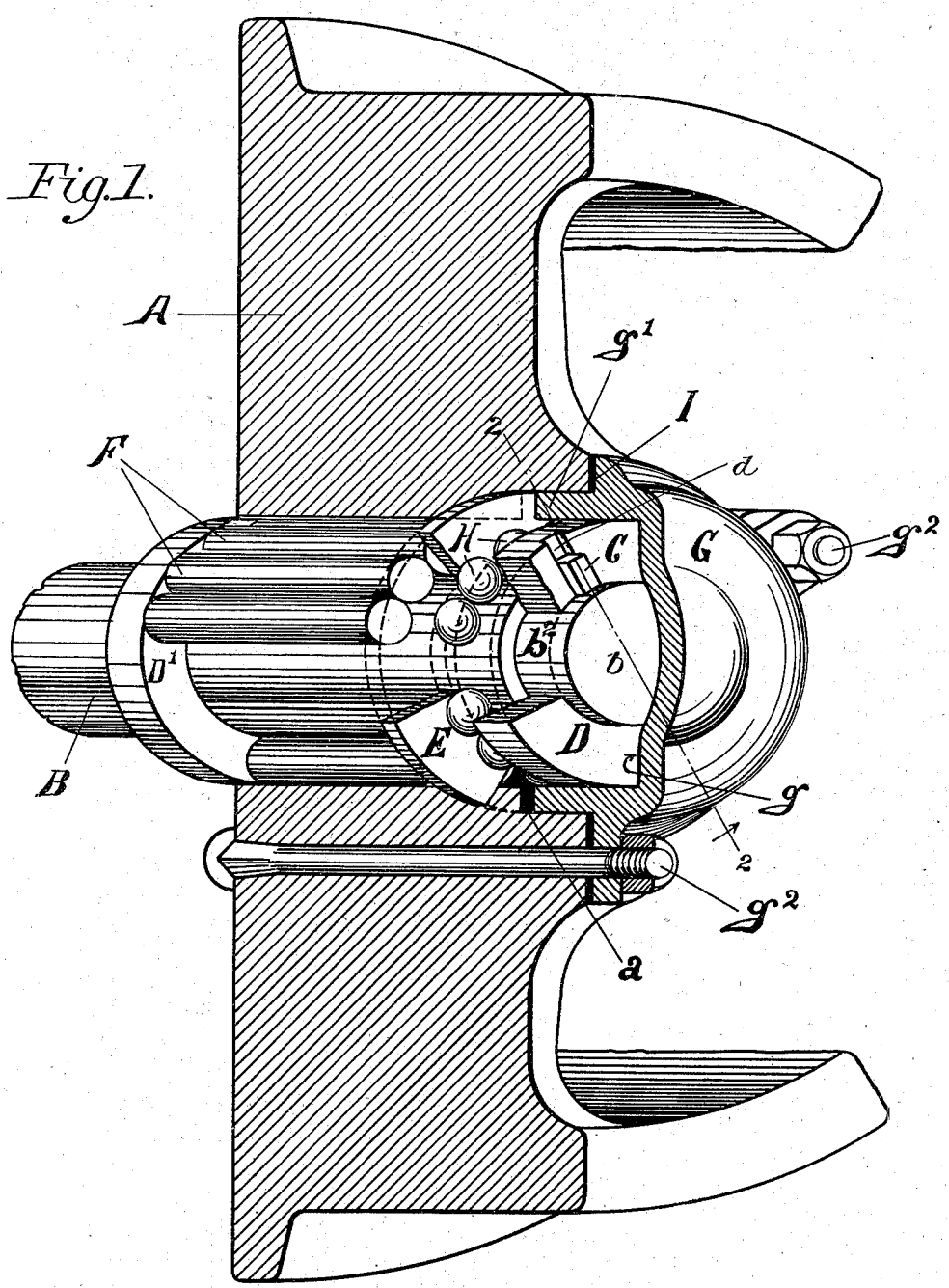
Figure 2:
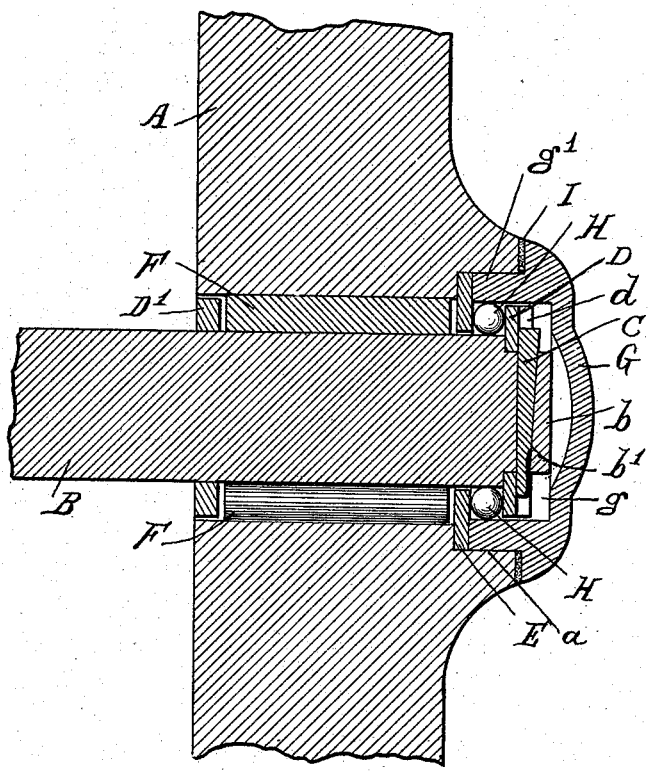

In the drawings, Figure 1 is a combined perspective and sectional view of a wheel embodying my improvements in position on the axle. Fig. 2 is a longitudinal section through the wheel and axle on the line 2 of Fig. 1.

Letters of reference designate the several parts of the mechanism.

The wheel A may be of any usual and well-known form. The axle B is of rolled steel. The front end of the axle B is turned to form a shoulder $b^2$ and accommodates a grooved collar D, which fits on the reduced end of the axle. A linchpin C fits in the groove $d$ in the collar D and passes through the transverse hole $b'$ in the axle B and retains the collar D in position on the axle. The collar D' is shrunk on or otherwise suitably secured to the axle. In the front end of the hub of the wheel A is an enlargement $a$ of the bore of the wheel. The washer E fits loosely around the axle B and fits within the enlarged bore $a$. The bore of the wheel A is of such diameter as to accommodate rollers F, surrounding the axle B. The diameter of the collars D and D' is equal to the diameter of the bore of the wheel. The cap G has a central annular cavity $g$ of the same diameter as the bore of the wheel and is provided with an inwardly-projecting flange $g'$, which fits in the enlarged part of the bore $a$, and the end of the flange abuts firmly against the washer E and serves to retain the washer in position. The balls H occupy the space surrounding the axle between the collar D and the washer E. Bolts $g^2$ serve to connect the cap G with the wheel, as clearly shown. A gasket I, interposed between the cap G and the front end of the hub of the wheel, serves to facilitate the adjustment of the cap to the wheel.

In a wheel provided with roller and ball bearings, as described, it is obvious that the collar D and the washer E, against which the balls H run, may be readily removed and others substituted, and that in case those parts become worn or broken the wheel will not need to be discarded, but the broken or worn parts may be replaced, and the wheel will then be as good as new.

A practical objection to roller and ball bearings is that the balls being in contact with the ends of the rollers tend to cause lateral displacement of the rollers. The washer E separating the balls H from the rollers F entirely obviates this objection.

The operation of the device is obvious from the description.

I am aware that fixed collars have heretofore been used to separate balls from rollers in ball and roller bearings.

I do not claim, broadly, the use of a washer or collar separating balls from rollers, but restrict my claim to the novel features of construction whereby the parts are rendered adjustable and readily removable for replacement or repair.

Having fully described my invention, what I claim as new, and desire to secure by Letters Patent, is—

In a ball and roller bearing for vehicles, the combination of; a shouldered axle having a hole adapted to receive a linchpin; a collar secured to said axle; a wheel having a central bore enlarged at its front end; a grooved collar fitting on the shoulder of said axle; a linchpin fitting in the groove in said collar and in the hole in said axle; a washer surrounding the axle and fitting in the enlarged part of said bore; rollers surrounding the axle between the washer and the fixed collar; balls surrounding the axle between the washer and the grooved collar; a recessed cap inclosing said grooved collar and having an inwardly-projecting flange abutting said washer; a gasket interposed between said cap and the hub of said wheel; and bolts connecting said cap with said hub; as set forth.

In witness whereof I have hereunto subscribed, at Springfield, Illinois, this 25th day of March, 1895.

IRVING BARKER.

Witnesses:
N. DuBois,
Henry A. Stevens.